United States Patent
Selever et al.

(10) Patent No.: US 7,748,499 B2
(45) Date of Patent: Jul. 6, 2010

(54) LUBRICATION FLOW CONTROL MECHANISM AND METHOD

(75) Inventors: Ted T. Selever, Farmington Hills, MI (US); William J. Crecelius, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1445 days.

(21) Appl. No.: 11/131,532

(22) Filed: May 18, 2005

(65) Prior Publication Data

US 2006/0054414 A1 Mar. 16, 2006

Related U.S. Application Data

(60) Provisional application No. 60/589,279, filed on Jul. 20, 2004.

(51) Int. Cl.
*F16C 19/30* (2006.01)
*F16H 57/04* (2010.01)

(52) U.S. Cl. .................. 184/6.12; 184/7.4; 384/606; 384/620

(58) Field of Classification Search .............. 184/7.4, 184/12, 6.12; 384/462, 466, 606, 620, 622, 384/618; 475/159, 160, 331
See application file for complete search history.

(56) References Cited

U.S. PATENT DOCUMENTS

| 3,662,608 | A | | 5/1972 | Vold | 74/5 |
| 4,179,952 | A | * | 12/1979 | Keske et al. | 475/160 |
| 4,459,869 | A | * | 7/1984 | Bucksch | 74/467 |
| 4,968,157 | A | * | 11/1990 | Chiba | 384/462 |
| 5,910,063 | A | | 6/1999 | Kato | 475/159 |
| 2002/0031289 | A1 | * | 3/2002 | Kenney, Jr. | 384/620 |
| 2002/0117356 | A1 | * | 8/2002 | Wittkopp | 184/7.4 |
| 2005/0202918 | A1 | * | 9/2005 | Mizon et al. | 475/198 |

FOREIGN PATENT DOCUMENTS

| DE | 4025445 A1 | 2/1992 |
| DE | 4115217 A1 | 11/1992 |
| JP | 61-48643 | * 3/1986 |

* cited by examiner

*Primary Examiner*—Bradley T King
*Assistant Examiner*—Thomas Irvin
(74) *Attorney, Agent, or Firm*—Quinn Law Group, PLLC

(57) ABSTRACT

A lubrication flow control mechanism for a power transmission includes a bearing member and a spring biasing the bearing member in a direction. The bearing member and the spring cooperate to sufficiently restrict flow past the bearing to cause increased fluid flow to a lubrication-requiring member located downstream of the bearing. A method of limiting lubrication flow in a transmission is also provided.

8 Claims, 2 Drawing Sheets

LUBRICATION FLOW CONTROL MECHANISM AND METHOD

CROSS-REFERENCE TO RELATED APPLICATIONS

This application claims the benefit of U.S. Provisional Application No. 60/589,279, filed Jul. 20, 2004, which is hereby incorporated by reference in its entirety.

TECHNICAL FIELD

This invention relates to lubrication of a power transmission.

BACKGROUND OF THE INVENTION

Lubrication fluid within a power transmission follows a path of least resistance. This makes it difficult to sufficiently lubricate transmission components that require fluid to flow along a more restrictive path when a less restricted path is also available. Due to assembly gaps formed between transmission components, unintended flow paths are created that must be addressed in order to ensure adequate flow to components located along more restricted paths.

SUMMARY OF THE INVENTION

A lubrication flow control mechanism for a power transmission is provided that enables sufficient lubricating fluid flow to lubrication requiring members located at restricted flow paths. Accordingly, a lubrication flow control mechanism includes a bearing and a spring biasing the bearing in a direction. The bearing member and the spring cooperate to sufficiently restrict a first flow passage to cause increased fluid flow to a second flow passage. The bearing and the spring sufficiently restrict flow past the bearing to cause increased fluid flow to a lubrication-requiring member located downstream of the bearing.

In one aspect of the invention, the bearing and spring cooperate to restrict flow in a first flow passage defined between a differential mechanism and a transmission gear, such as a sun gear. The bearing and the spring are disposed between the differential mechanism and the gear in the first flow passage. The bearing may include an inner bearing race connected to the transmission gear for rotation therewith as well as an outer bearing race connected to the differential mechanism for rotation therewith. Preferably, the outer bearing race has an axial flange formed with circumferentially-spaced slots. The spring includes circumferentially-spaced tabs fittable within the slots so that the spring is secured to the outer bearing race for rotation therewith. Preferably, the tabs extend from the small diameter end of the spring. The spring is compressible and extendable so that a large diameter end of the spring contacts the differential mechanism when the tabs are fitted in the slots.

In another aspect of the invention, the differential mechanism includes a differential carrier and a side gear rotatable with respect to the carrier. The differential carrier partially defines the first flow passage and the side gear partially defines the second flow passage. Specifically, the second flow passage is defined between intermeshing teeth of the side gear in the rotatable shaft.

A method of limiting lubrication flow in a transmission includes providing a thrust bearing and connecting a spring with the thrust bearing. In another step, the thrust bearing and spring are positioned between adjacent transmission components. In another step, fluid is directed toward the thrust bearing and spring. Radial flow of the directed fluid between the adjacent transmission components is blocked and fluid flow is increased downstream of the thrust bearing and spring via the positioning step. Thus, the method may include lubricating a downstream transmission component (e.g., such as the side gear) with the increased downstream fluid flow.

The above features and advantages and other features and advantages of the present invention are readily apparent from the following detailed description of the best mode for carrying out the invention when taken in connection with the accompanying drawings.

BRIEF DESCRIPTION OF THE DRAWINGS

FIG. 3 is a schematic cross-sectional illustration in fragmentary view of the transmission of FIGS. 1 and 2, showing a spring abutting the bearing of FIG. 2; and FIG. 4 is a schematic perspective illustration in fragmentary cross-sectional view of the spring of FIG. 3 connected with the bearing of FIGS. 2 and 3.

DESCRIPTION OF THE PREFERRED EMBODIMENT

Figure 1:
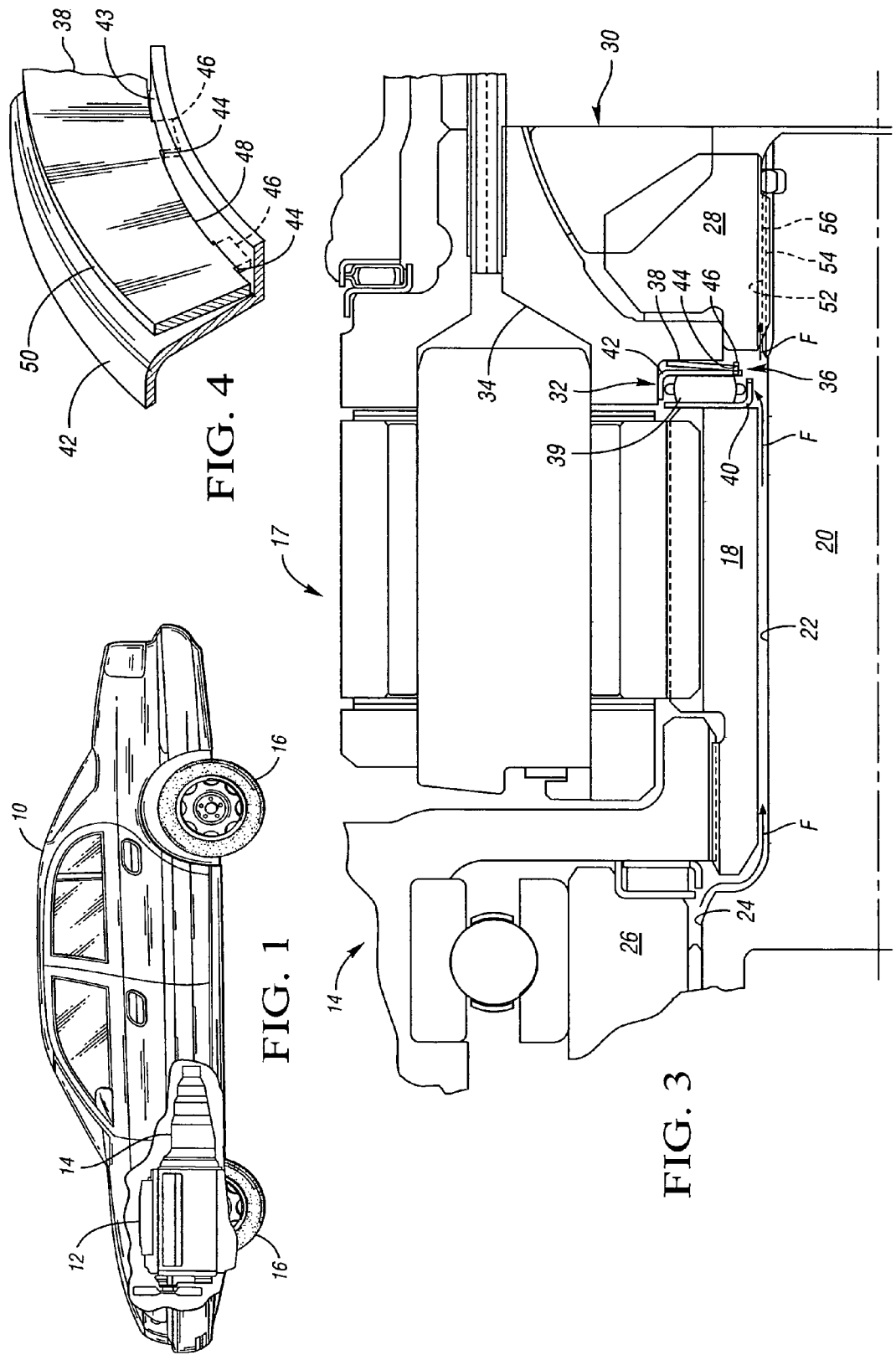
FIG. 1 is a schematic side view illustration of a vehicle including a power transmission.

Referring to the drawings, wherein like reference numbers refer to like components, a vehicle 10 includes an engine 12 operatively connected to a transmission 14 for transmitting power to wheels 16 to propel the vehicle, as is know in the art.

Figure 2:
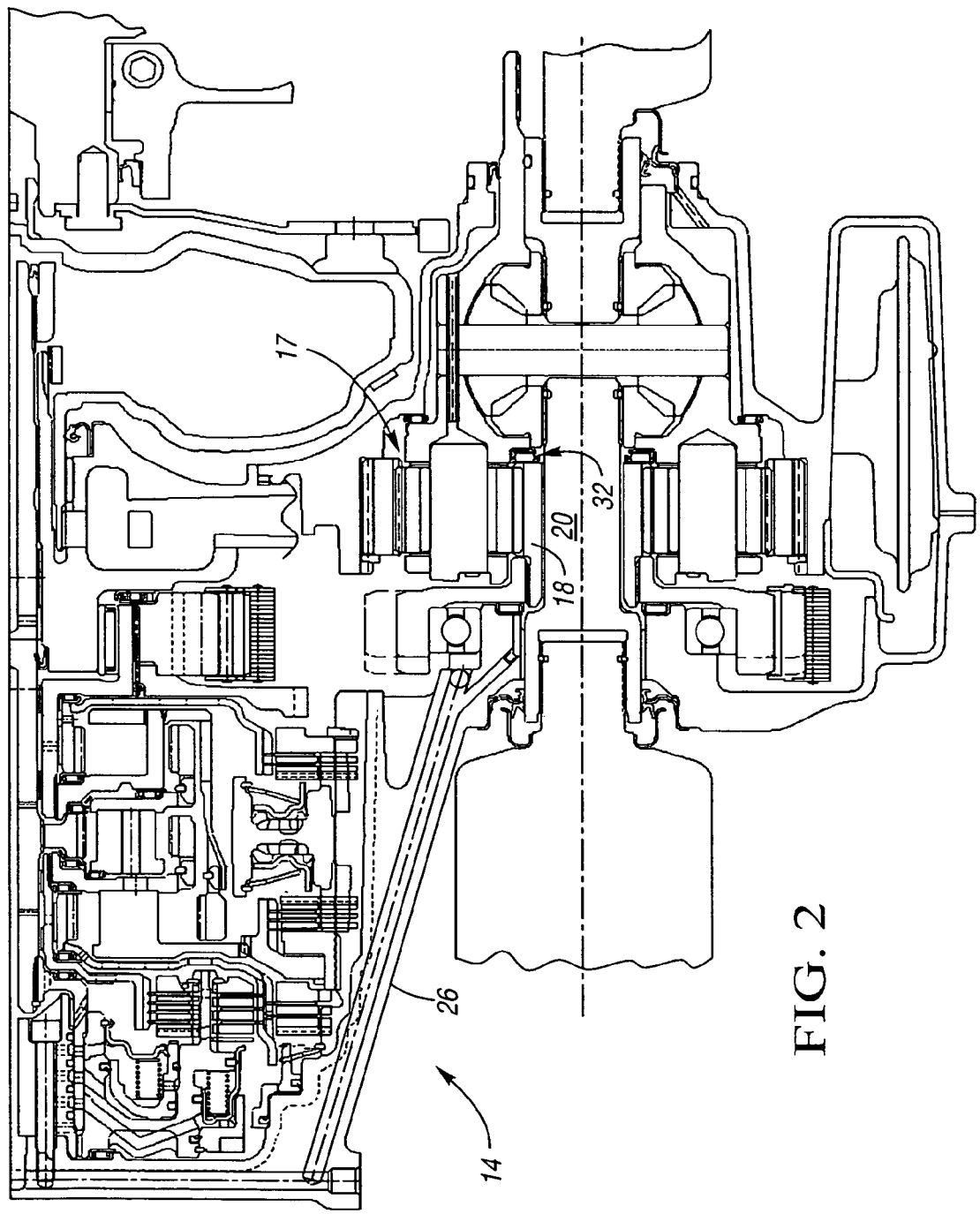
FIG. 2 is a schematic cross-sectional illustration in fragmentary view of the transmission of FIG. 1, including a needle thrust bearing.

Referring to FIGS. 2 and 3, the power transmission 14 includes a planetary gear set 17 that has an output sun gear 18 disposed adjacent to a transmission output shaft 20 and rotatable with the shaft 20, forming an intermediate flow passage 22 therebetween. Fluid is supplied to the intermediate flow passage 22 through a feeder passage 24 formed at least partially by a transmission case 26. A fluid source, such as a pump (not shown), provides fluid gathered in an oil sump (not shown) to the feeder passage 24, as is well understood by those skilled in the art. (Fluid flow is represented by arrows labeled F shown in the various flow passages described herein.)

The fluid passing between the sun gear 18 and the output shaft 20 via the intermediate flow passage 22 is eventually supplied to a side gear 28 of a differential mechanism 30. The lubrication fluid passing through the intermediate flow passage 22 also encounters a needle thrust bearing 32, which is positioned between the output sun gear 18 and a differential carrier 34. In order to restrict a first flow passage 36 past the bearing 32 in an axial space between the sun gear 18 and the differential carrier 34, a wave or Belleville spring 38 is positioned between the thrust bearing 32 and the differential carrier 34. This enforces axial tightness of the space occupied by the thrust bearing 32, thereby limiting direct radial flow past the thrust bearing 32 (i.e., through the space between the sun gear 18 and the differential carrier 34). Centrifugal force will encourage such radially-outward flow.

The bearing 32 includes a roller element 39 disposed between a generally annular inner bearing race 40 and a generally annular outer bearing race 42. The inner bearing race 40 is secured to the sun gear 18 via welding or any other known connecting means. The outer bearing race 42 is secured to the differential carrier 34 by any known connecting means. As best shown in FIG. 4, the outer bearing race 42 includes an axial flange 43 formed with a plurality of circumferentially spaced slots 44. The spring 38 includes a plurality of circumferentially spaced tabs 46 extending from an inner diameter 48. The tabs 46 fit within corresponding slots 44 to secure the spring 38 to the outer bearing race 42 for rotation therewith. An outer diameter 50 of the spring 38 rests against the differential carrier 34 (shown in FIG. 3). The spring 38 flexes axially between its inner and outer diameters so that the bearing 32 and spring 38 together fill the axial space between the sun gear 18 and the differential carrier 34 and prevent fluid flow radially past the bearing 32 through the first flow passage 36 defined between the sun gear 18 and differential carrier 34.

In normal thrust bearing operation, the bearing 32 is not always fully loaded and therefore can provide a large flow area for the lubrication fluid. The spring 38 prevents this large flow area from being presented to the lubrication flow by limiting the discharge of fluid radially through the planetary gear set 17 via the first flow passage 36. The bearing 32 and spring 38 together form a lubrication flow limiting assembly 32, 38 which acts as a dam to force fluid toward, for example, a second flow passage 52 formed between respective intermeshing teeth 54, 56 of the intermeshing side gear 28 and output shaft 20. Thus, the lubrication flow limiting assembly 32, 38, by virtue of the biasing function of the spring 38, causes more efficient fluid flow to high resistance flow areas, such as the second flow passage 52, thus providing better lubrication to components at such high resistance flow areas, such as the side gear 28.

While the best mode for carrying out the invention has been described in detail, those familiar with the art to which this invention relates will recognize various alternative designs and embodiments for practicing the invention within the scope of the appended claims.

The invention claimed is:

1. A lubrication flow control mechanism for a power transmission comprising:
 a bearing;
 a spring biasing said bearing in a direction;
 wherein said bearing and said spring cooperate to sufficiently restrict flow past said bearing to cause increased fluid flow to a lubrication-requiring member located axially downstream of said bearing;
 wherein said bearing includes a generally annular inner bearing race and a generally annular outer bearing race; wherein said outer bearing race includes an axial flange formed with circumferentially-spaced slots; and wherein said spring is generally annular and includes circumferentially-spaced tabs fittable within said slots such that said spring is secured to said outer bearing race for rotation therewith.

2. The lubrication flow control mechanism of claim 1, wherein said bearing and spring cooperate to restrict flow in a first flow passage defined between a differential mechanism and a transmission gear, said bearing and said spring being disposed between said differential mechanism and said gear in said first flow passage.

3. The lubrication flow control mechanism of claim 2, wherein said generally annular inner bearing race is connected to said transmission gear for rotation therewith; and wherein said generally annular outer bearing race is connected to said differential mechanism for rotation therewith.

4. The lubrication flow control mechanism of claim 3, wherein said spring has a small diameter end from which said tabs extend and a large diameter end; and
 wherein said spring is compressible and extendable so that said large diameter end contacts said differential mechanism when said tabs are fitted in said slots.

5. The lubrication flow control mechanism of claim 2, wherein a second flow passage is defined between said differential mechanism and a rotatable shaft intermeshing with said differential mechanism; wherein said second flow passage is downstream of said first flow passage; and
 wherein said lubrication requiring member is said differential mechanism, said increased fluid flow being in said second flow passage.

6. The lubrication flow control mechanism of claim 5, wherein said differential mechanism includes a differential carrier and a side gear rotatable with respect to said carrier; and
 wherein said differential carrier partially defines said first flow passage and said side gear partially defines said second flow passage.

7. The lubrication flow control mechanism of claim 6, wherein said second flow passage is defined between intermeshing teeth of said side gear and said rotatable shaft.

8. A lubrication flow control mechanism for a power transmission comprising:
 a rotatable shaft;
 a transmission gear rotatable with said shaft;
 a differential mechanism including a differential carrier and a side gear intermeshable with said shaft;
 a thrust bearing;
 an annular spring connected with said thrust bearing for rotation with said thrust bearing;
 said thrust bearing and said spring being positioned axially between said transmission gear and said differential carrier to substantially block radial fluid flow past said bearing and spring through a first flow passage defined by said transmission gear and said differential carrier;
 wherein said transmission gear and said shaft define an intermediate flow passage therebetween;
 wherein said side gear and said shaft define a second flow passage therebetween located downstream of said intermediate flow passage and said first flow passage;
 said thrust bearing and spring being configured to permit sufficient lubrication of said side gear by restricting fluid flow through said first flow passage and thereby increasing fluid flow from said intermediate flow passage to said side gear through said second flow passage;
 wherein said bearing includes a generally annular inner bearing race and a generally annular outer bearing race;
 wherein said outer bearing race includes an axial flange formed with circumferentially-spaced slots; and
 wherein said spring is generally annular and includes circumferentially-spaced tabs fittable within said slots such that said spring is secured to said outer bearing race for rotation therewith.

* * * * *